United States Patent
Kung et al.

(10) Patent No.: US 9,971,229 B2
(45) Date of Patent: *May 15, 2018

(54) SUPERCONTINUUM GENERATION APPARATUS AND METHOD

(71) Applicant: Academia Sinica, Taipei (TW)

(72) Inventors: Andrew Hing Cheong Kung, Hsinchu (TW); Yu-Chen Cheng, New Taipei (TW); Chih-Hsuan Lu, Pingtung County (TW)

(73) Assignee: ACADEMIA SINICA, Taipei (TW)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/262,725

(22) Filed: Sep. 12, 2016

(65) Prior Publication Data

US 2017/0082909 A1    Mar. 23, 2017

Related U.S. Application Data

(60) Provisional application No. 62/219,787, filed on Sep. 17, 2015.

(51) Int. Cl.
   *G01J 1/00*    (2006.01)
   *G02F 1/35*   (2006.01)
   (Continued)

(52) U.S. Cl.
   CPC ............ *G02F 1/353* (2013.01); *G01J 1/4257* (2013.01); *G02F 1/3501* (2013.01);
   (Continued)

(58) Field of Classification Search
   CPC .... G01J 1/4257; G02F 1/3511; G02F 1/3555; H01S 3/0092
   (Continued)

(56) References Cited

U.S. PATENT DOCUMENTS 3,373,651 A * 3/1968 MacK ............... G01J 3/26
                                                356/454
5,559,634 A   9/1996 Weber
(Continued)

FOREIGN PATENT DOCUMENTS

CN     101827662 A    9/2010
CN     103022867 A    4/2013
(Continued)

OTHER PUBLICATIONS

Andy Kung, "Synthesis of Single-Cycle Optical Fields," The 75th JSAP Autumn Meeting, 2014, Sep. 17, 2014.
(Continued)

*Primary Examiner* — Isiaka Akanbi
(74) *Attorney, Agent, or Firm* — Meagher Emanuel Laks Goldberg & Liao, LLP

(57) ABSTRACT

Apparatuses and methods for supercontinuum generation using a laser beam and a plurality of condensed state transparent plates are presented. As an example, plate material to be used for one of the plurality of plates is determined. A thickness of the one of the plurality of plates is also determined. An allowable laser intensity of the laser beam is then determined to be $\lambda/(2n_0 n_2 L)$, where $\lambda$ is the central incident wavelength in vacuum, $n_0$ is the linear refractive index, $n_2$ is the third-order nonlinear coefficient. A location of a next plate is then determined to be a distance downstream from the one of the plurality of plates where a laser intensity of the laser beam returns to a value of the determined allowable laser intensity.

28 Claims, 8 Drawing Sheets

(51) Int. Cl.
*H01S 3/00* (2006.01)
*G01J 1/42* (2006.01)
*G02F 1/355* (2006.01)

(52) U.S. Cl.
CPC .......... *G02F 1/3511* (2013.01); *G02F 1/3555* (2013.01); *H01S 3/0092* (2013.01); *G02F 2001/354* (2013.01); *G02F 2001/3507* (2013.01); *G02F 2001/3528* (2013.01); *H01S 2301/08* (2013.01)

(58) Field of Classification Search
USPC ................................. 356/364, 121, 454, 401
See application file for complete search history.

(56) References Cited

U.S. PATENT DOCUMENTS

| 6,055,220 | A | 4/2000 | Mamin et al. | |
| 6,096,375 | A | 8/2000 | Ouderkirk et al. | |
| 6,795,473 | B1* | 9/2004 | Kleinschmidt | G02B 5/1814 372/55 |
| 7,245,805 | B2 | 7/2007 | Alfano et al. | |
| 8,731,009 | B2 | 5/2014 | Buchter | |
| 9,389,483 | B2 | 7/2016 | Kung et al. | |
| 2002/0171817 | A1 | 11/2002 | Babonneau et al. | |
| 2003/0001991 | A1 | 1/2003 | Faris et al. | |
| 2005/0226577 | A1 | 10/2005 | Alfano et al. | |
| 2008/0049584 | A1 | 2/2008 | Tan et al. | |
| 2009/0078870 | A1 | 3/2009 | Haruna | |
| 2010/0245819 | A1* | 9/2010 | Li | G01B 11/0641 356/327 |
| 2012/0207007 | A1 | 8/2012 | Miyasaka et al. | |
| 2014/0330097 | A1 | 11/2014 | Weiss et al. | |
| 2015/0038313 | A1 | 2/2015 | Hosseini | |

FOREIGN PATENT DOCUMENTS

| TW | 200937005 | 9/2009 |
| TW | 201111890 | 4/2011 |
| TW | I358538 | 2/2012 |
| TW | I408481 | 9/2013 |

OTHER PUBLICATIONS

Chih-Hsuan Lu, et al., "Generation of Intense Supercontinuum based on Multiple Plates of Fused Silica," The 5th International Symposium on Filamentation (COFIL2014), Sep. 18, 2014.

Yu-Jung Tsao, "Characterization of octave-spanning continuum generated from multiple SiO2 plates," Abstract of Thesis, Institute of Electro-Optical Engineering, National Tsing Hua University, 2014.

Hong-Yu Chen, et al., "Characterization of octave-spanning continuum generated from multiple SiO2 plates," Optics & Photonics Taiwan, the International Conference (OPTIC) 2014, Dec. 4-5, 2014, pp. 1-pp. 2.

Bo-Han Chen, et al., "Generation of Intense Supercontinuum in Condensed Media," Optics & Photonics Taiwan, the International Conference (OPTIC) 2014, Dec. 4-5, 2014, pp. 1-pp. 2.

Yu-Chen Cheng, et al., "Modeling of Multiple Plate Continuum Generation," Optics & Photonics Taiwan, the International Conference (OPTIC) 2014, Dec. 4-5, 2014, pp. 1-pp. 2.

Pin-Hsiang Wang, et al., "Characterization of octave-spanning continuum generated from multiple SiO, plates," Abstract of research article, Annual Meeting of the Physical Society of Republic of China, Jan. 28-30, 2015.

Chih-Hsuan Lu, et al., "Generation of Intense Supercontinuum in Condensed Media," Abstract of research article, Annual Meeting of the Physical Society of Republic of China, Jan. 28-30, 2015.

Yu-Chen Cheng, et al., "Modeling of Multiple Plate Continuum Generation," Abstract of research article, Annual Meeting of the Physical Society of Republic of China, Jan. 28-30, 2015.

Andy Kung, "MPContinuum, an Intense Supercontinuum Generated in Condensed Media," Abstract of research article, Annual Meeting of the Physical Society of Republic of China, Jan. 28-30, 2015.

Chih-Hsuan Lu, et al., "Generation of intense supercontinuum in condensed media," Optica, vol. 1, No. 6, Dec. 10, 2014, pp. 400-pp. 406.

Chih-Hsuan Lu, et al., "Generation of intense supercontinuum in condensed media," Conference on Lasers and Electro-Optics-European Quantum Electronics Conference(CLEO/EUROPE—EQEC 2015), Authors Notification, Mar. 23, 2015.

Chih-Hsuan Lu, et al., "A new and improved approach to supercontinuum generation in solids," CLEO: 2014 Laser Science to Photonic Applications. Technical Conference, Jun. 12, 2014.

* cited by examiner

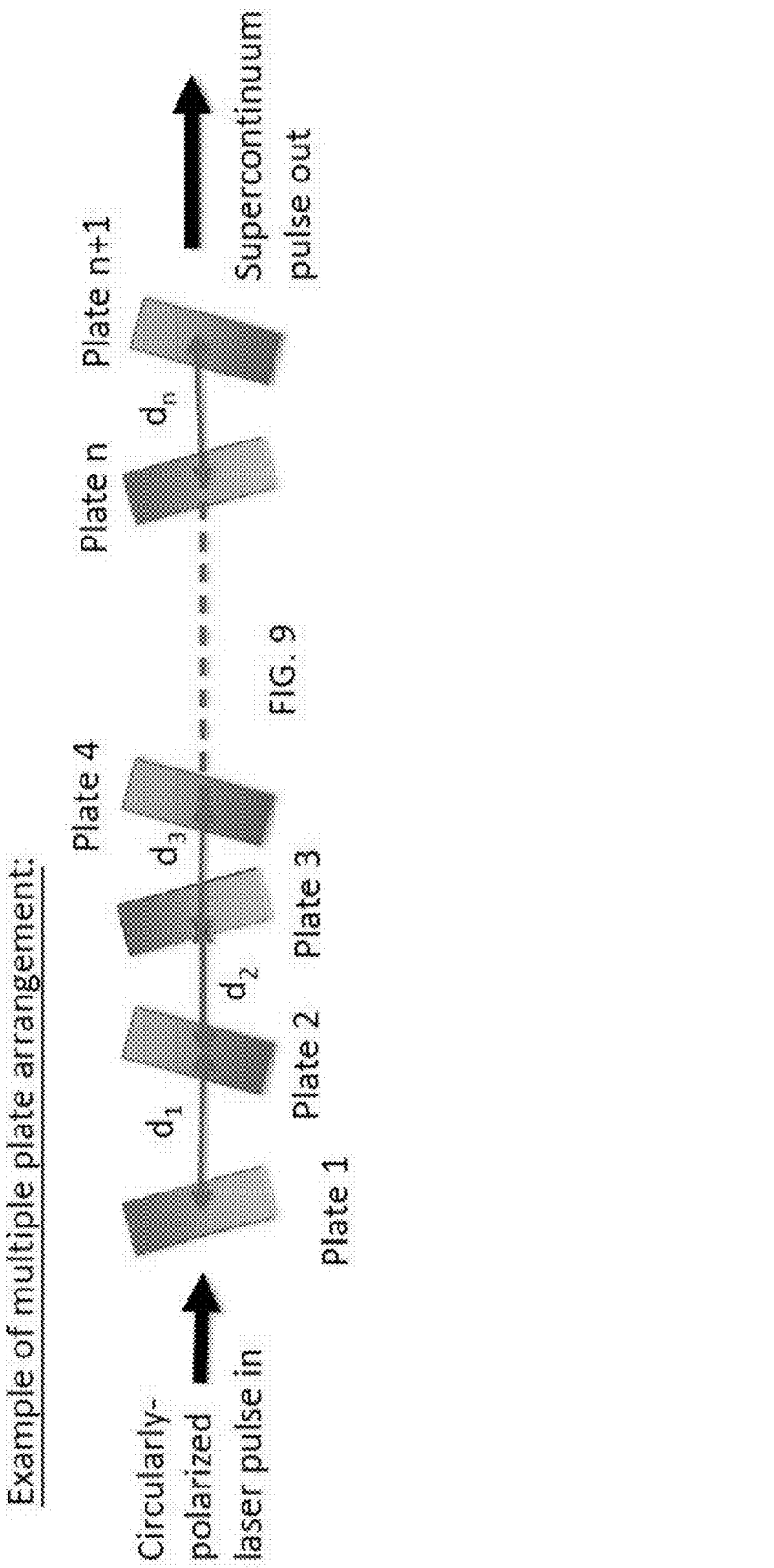

SUPERCONTINUUM GENERATION APPARATUS AND METHOD

CROSS REFERENCE TO RELATED APPLICATION

This patent application claims the benefit of U.S. Provisional Application No. 62/219,787 filed on Sep. 17, 2015 and titled "Supercontinuum Generation Apparatus and Method."

BACKGROUND OF THE INVENTION

Field of the Invention

The present principles relate to improved systems and methods for the design and construction of a multi-plate supercontinuum generator. Once the laser pulse characteristics, namely laser power, pulse duration, and/or laser wavelength are known and the material of the medium is chosen, the other parameters, namely the incident laser intensity, the thickness of each plate and the proper spacing between each pair of plates are determined using criteria disclosed according to the present principles based on analysis of the physical process in supercontinuum generation realized in this invention.

Background Information

The present principles describe an exemplary replacement of many existing commercial products such as Femtolaser's Hollow Fiber Compressor—Kaleidoscope™ or those based on nonlinear photonic crystals or fibers that targets generation of a supercontinuum and its applications. A typical Femtolaser Hollow Fiber Compressor—Kaleidoscope™ product for supercontinuum generation in a gas and compression optics includes:
- hollow fiber chamber
- equipped with a V-groove fiber mount
- Brewster-angled input and exit windows
- lateral observation window
- gas inlet/outlet, mounted on two xz translational stages
- includes 1 m of fused silica hollow fiber
- this product uses gas phase and requires 0.4 to 1.5 mJ of laser power

SUMMARY OF THE INVENTION

The advantages of using multiple plates for supercontinuum generation include that it is an all solid state device, robust, reliable, long life, easy to align, easy to operate, and versatile. It requires less table-top space for its installation. It can be used for a large range of laser powers and wavelengths. Current method of building a multi-plate device is clumsy and relies on skilled workers for its assembly. This invention offers a systematic algorithm to the design and manufacture of the device which takes away a lot of the guess work to make the device easy to manufacture without need for highly-skilled personnel that current similar device requires. Further advantage of this invention is through a systematic approach to building the device it affords the use of mixed material and plate thickness in one device. This versatility allows better optimization of the device's performance.

The present principles provide methods and apparatuses to produce a new light source for applications that use broadband optical emission. These applications include (1) ultrafast science and ultrafast optical technology; (2) optical coherence tomography; (3) time-resolved spectroscopic sensing; and/or (4) large-field multiphoton microscopy.

DETAILED DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein:

FIG. 9 illustrates another exemplary arrangement according to the present principles.

Figure 1:
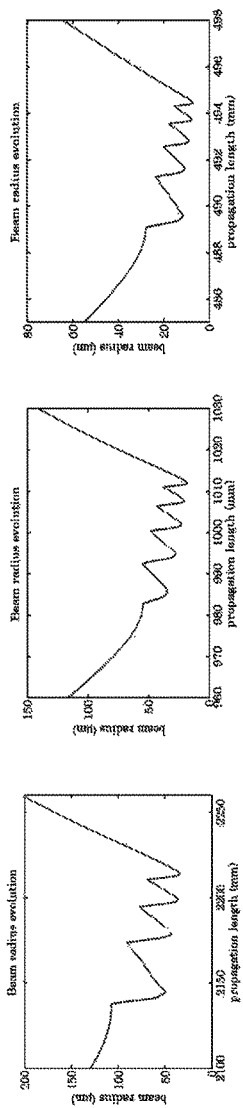
FIG. 1 shows the variation in the size of a laser beam as the pulse propagates through the system of fused silica plates for three different initial laser powers (energy)

The examples set out herein illustrate exemplary embodiments of the invention. Such examples are not to be construed as limiting the scope of the invention in any manner.

DETAILED DESCRIPTION

Major advantages of using multiple plates as a solution to generation of a femtosecond supercontinuum (continuous spectrum of light) are that it is simple, easy to use, robust, and is applicable for a broad range of femtosecond laser power. The present principles disclose a systematic approach to the construction of a multi-plate supercontinuum generator. The present principles are easy to implement, designed for simple manufacturing, cost effective, and requires only minimally-trained personnel for its assembly.

Existing technology in using multiple plates for supercontinuum generation employs empirical means to construct the supercontinuum generator. It is time consuming, not cost effective, and requires well-trained and skillful personnel to manufacture the device.

Existing commercial femtosecond supercontinuum generators and white-light sources must operate within a few times the critical power for self-focusing of the generating medium, if the medium is a gas the critical power is in the order of 10 GW. If it is a condensed medium where the nonlinear refractive index is about 1000 times larger than that of gases, it is a few MW. So they are laser specific. They are easily damaged so that useful life time of some devices are limited to hours or days.

One solution that could bridge the power gap uses large-bore fibers or waveguides to confine the laser beam. However, these devices are wavelength specific, hard to align and prone to damage also.

There are several merits of having a laser pulse with a broad, and even an octave-spanning coherent optical spectrum or supercontinuum: the supercontinuum is a prerequisite to the formation of a single-cycle optical pulse and in the generation of isolated attosecond pulses that are essential for the investigation of attosecond dynamics. An intense supercontinuum also facilitates high-speed high-resolution image acquisition in optical coherence tomography, or in controlling the carrier-envelope offset in frequency combs and stabilizing the carrier-envelope phase of ultrashort optical pulses. The physics of supercontinuum generation is well studied.

An octave-spanning supercontinuum is produced when an intense femtosecond optical pulse with a threshold peak power that is slightly (~1.7 to 1.8 times) above the critical power $P_{cr}$ for self-focusing propagates through a medium. Self-phase modulation begins to broaden the spectrum. Meanwhile Kerr-induced nonlinear dispersion results in the formation of an optical shock wave accompanied by a rapid phase jump that leads to a broad spectral pedestal extending to the blue and that has a sharp cut-off. The range of spectral broadening, however, does not scale up with power. Multiphoton absorption and plasma formation set in at higher peak power, putting a clamp on the peak intensity of the shock wave that prevents pulse collapse. Plasma defocusing and dispersion take hold as the pulse continues to propagate through the medium.

In reality, amplitude fluctuation and phase noise in the pulse lead to modulational instability that breaks up the beam and produce spatial and temporal localized shock waves, called solitons, destroying the space-time coherence of the supercontinuum. Guiding the pulse in a hollow fiber or in a nonlinear photonic crystal fiber has helped to lower the incident intensity for efficient generation and thus reduces MPA and photoionization. Yet guiding of a laser beam through the fiber or fiber-like device requires elaborate optical arrangement for efficient light transmission and to avoid permanent damage to the fiber. The extended interaction length in wave guiding fiber devices enhances the growth of Raman-like processes to introduce phase noise to significantly compromise the coherence quality of the pulse.

Consequently the generation of a supercontinuum that has good coherent properties has been limited to within a few times the threshold power. In gases the threshold power is in the order of 10 GW. In condensed media where the nonlinear refractive index is about 1000 times larger than that of gases, it is a few MW. This leaves a gap of nearly three orders of magnitude in femtosecond pulse laser power where a suitable medium available for quality supercontinuum generation is missing. A new solution is needed to cover the full range of laser powers from MW level to multi-GW level that are in circulation in the market place.

Up until now, theoretical investigations and the practice of supercontinuum generation have concentrated entirely in a single continuous medium. Situations involving a medium that has multiple interfaces have not been considered. Here we consider the case where pulse propagation in the medium is interrupted by discontinuity or interfaces so that the growth of unfavorable effects is mediated while the desirable effects such as spectrum broadening as is the case here is enhanced. We find that in this situation the results are vastly in favor of broad spectrum generation. Recently we described the generation of an intense femtosecond supercontinuum in a medium consisting of multiple air/solid interfaces to result in pulse energy and mode quality that approach those generated in the gas phase while preserving the advantages of a condensed medium of being compact, simple to operate, and highly reproducible. This is achieved by placing several thin solid plates at or near the focused waist of a high-power laser pulse.

The thickness of each plate is such that the optical pulse exits the plate before unfavorable effects begin to take hold of the pulse. In this example we obtained pulses that have an octave-spanning spectrum that covers from 450 to 980 nm at the −20 dB intensity level while converting over 60% of the input pulse energy to the continuum. The highest pulse energy achieved was over 200 μJ. The transverse mode of the pulse closely resembles that of a Gaussian pulse profile to within 25% (M-square of 1.25). Diagnostic measurements indicate that the pulse is phase coherent and could be compressed to a few femtoseconds. Furthermore, this multiplate approach was shown to be extremely flexible and versatile. It was applicable for a broad range of input powers and materials. The generated continuum pulse was robust and stable.

In this recent experiment, and subsequent related disclosure of the technology, both the acceptable thickness of each plate and the optimal spacing between every pair of adjacent plates were determined empirically by experimental trial and error. It is time consuming and not cost effective to manufacture. A systematic solution is therefore needed for the design and manufacture of the device.

Accordingly, we describe a systematic approach to produce a femtosecond supercontinuum by cascaded generation in a medium consisting of a multiple number of thin plates. Once the laser pulse characteristics, namely laser power, pulse duration, and laser wavelength are known and the material of the medium is selected, we show here how to systematically determine the critical parameters, namely the incident laser intensity, the thickness of each plate and the proper spacing between each pair of plates for efficient production of a broadband supercontinuum. This improved method will also allow simultaneous utility of different material and medium thickness easily in a single device that is extremely difficult to implement empirically.

From theoretical models that have been developed for the supercontinuum generation process it is known that the spectrum of a femtosecond laser pulse expands by physical processes known as self-phase modulation and self-steepening leading to the formation of a shock wave during propagation of the intense laser pulse through a medium. At the same time known and unknown not so favorable nonlinear optical processes will compete with spectral expansion to prohibit or terminate the spectral expansion and sometimes destroy the pulse altogether. Known examples of these undesirable processes are multiphoton absorption, avalanche ionization, filamentation, and multifilamentation caused by amplitude and phase fluctuations inherent in the laser pulse. Each of these processes is associated with a characteristic parameter such as length or laser intensity for any given medium. This disclosure describes a method that allows for optimizing the production of the broadest spectrum that forms a broadband white-light (or broad infrared) laser source while keeping the unfavorable events from influencing the process.

In supercontinuum generation there are a number of physical dimensions involved. These include physical length of the medium, diffraction length (distance over which the optical beam holds together), coherence length (distance where the phase difference among various waves is less than $\pi$ radians), and nonlinear or Kerr length (distance over which the phase change induced by intense laser field is $\pi$ radian). From our theoretical simulation of the supercontinuum generation process, we can show that among these dimensions the Kerr length is most significant in affecting the final outcome of the process. If the accumulated phase change in the pulse during its passage through the medium becomes large newly produced colors will dissipate away from the laser beam and become lost. The desirable maximum phase change is π radians. The distance in the material over which a phase of π radians is acquired is called the Kerr length. This Kerr length can be expressed as λ divided by the product of 2 times $n_0$, $n_2$, and the incident laser intensity $I_{laser}$, or $\lambda/(2n_0 n_2 I_{laser})$. Here λ is the central incident wavelength in vacuum, $n_0$ is the linear refractive index, $n_2$ is the third-order nonlinear coefficient or Kerr coefficient of the material that can be measured or obtained from scientific literature. Meanwhile, there is an upper limit for $I_{laser}$ called $I_{damage}$ or a laser damage intensity, is set by multiphoton absorption and avalanche ionization of the material. Therefore the method for supercontinuum generation is to choose a thickness L for the medium and determine the maximum laser intensity $I_{laser}$ according to $I_{laser}$ slightly less than $\lambda/(2n_0 n_2 L)$ while satisfying $I_{laser} < I_{damage}$. It is prudent to use $I_{laser} \cong 0.5$ to 0.9 times $I_{damage}$ to provide a safety margin on longevity for the material. Note that it is the product L times $I_{laser}$ that has to remain constant for a given material. Since the choice of the thickness L is usually more restrictive, in general it will be more common that $I_{laser}$ is fixed by the available L.

Once L and $I_{laser}$ are determined as described, the next step is to determine the location of each plate. Modeling of the supercontinuum generation process with multiple thin plates using the nonlinear propagation equation (see for example L. Berge, S. Skupin, R. Nuter, J. Kasparian, and J. P. Wolf, "Ultrashort filaments of light in weakly ionized, optically transparent media," Rep. Prog. Phys. 70, 1633 (2007)) shows that upon exiting each plate the pulse will first focus to a smaller spot size due to radially decreasing Kerr phases accumulated inside the plate. The pulse intensity will be larger than $I_{damage}$. Upon continuing propagation the pulse will diffract and its size enlarges. At a distance D downstream from the plate the pulse intensity will return to the value $I_{laser}$. Beyond D the intensity will drop below $I_{laser}$. From the above discussion it is clear that for maximum effect on spectral expansion, the location of the next plate is then at D. There is no simple analytic expression to find D because of large spectral dispersion and nonlinear phases experienced by the pulse on its passage through the previous plate is a complex process. It is possible to solve the nonlinear propagation by numerical calculation to find D. The calculation also gives the amount of expansion in the spectrum of the pulse through the next plate. This procedure of solving for the location of the next plate is repeated for every subsequent plate until the spectrum expansion reaches its limit set by the material. Depending on the initial laser pulse power, the thicknesses L of the plates and the value of $n_2$, and for practical purposes the number of plates needed for full spectral expansion is between 2 and 10. In one exemplary embodiment according to the present principles, the plurality of optical plates are optically polished.

As an illustration we show in FIG. 1 the variation in the size of the laser beam as the pulse propagates through the system of fused silica plates for three different initial laser powers (energy). The pulse duration is 25 fs. The plate thickness is 100 μm. In particular, FIG. 1 shows calculated beam radius as a function of propagation distance for 100 mm thick fused silica plates, with incident pulse energy: 140 mJ (shown at left panel); 37.5 mJ (shown in the middle panel); 8.75 mJ (shown at the right panel). The first plate is located at the first break in the radius. The spacing between each local maximum of the radius gives the distance between each pair of adjacent plates. The figure shows an abrupt change to the beam size at the location of each plate due to self-focusing after passage through each plate. The figure also shows that every plate is placed at the location where the pulse intensity returns to the value equal to that into the first plate. Tables 1 and 2 show the calculated distance between plates and the incident laser power at each plate location, respectively.

TABLE 1 calculated and experimental spacing between plates for different incident laser pulse energy of a 25 fs pulse.

| | Spacing D(mm) between plate | | | |
|---|---|---|---|---|
| Input pulse energy (μJ) | 1&2 | 2&3 | 3&4 | 4&5 |
| 37.5 | 9.75 | 7.75 | 6.13 | 4.63 |
| 8.75 | 2.16 | 1.31 | 1 | 0.75 |
| 140 (calculated, I = 30.84 TW/cm$^2$) | 33.9 | 21.3 | 15.75 | |
| 140 (experiment value for comparison) | 36 | 21 | 16 | |

TABLE 2

Laser intensity at the location of each plate for different incident laser power, showing the intensity is the same at the point of entrance to each plate.

| | Calculated intensity (TW/cm$^2$) for normal incidence | | | | | |
|---|---|---|---|---|---|---|
| Incident pulse energy | First plate | second | third | fourth | fifth | average |
| 37.5 μJ F# = 110 (f = 985 mm) | 28.6 | 28.4 | 28.8 | 29 | 28.8 | 28.72 |
| 8.75 μJ F# = 55 (f = 493 mm) | 27 | 28.9 | 28.4 | 29 | 27.8 | 28.22 |
| 140 μJ F# = 240 (f = 2150 mm) | 31.9 | 27.1 | 29.7 | 26.4 | — | 28.78 |

Accordingly, FIG. 1 and the associated tables above show the calculated location for each plate and the incident laser power at that location. The criteria of maintaining the same incident laser intensity is demonstrated in this illustration.

Figure 2:
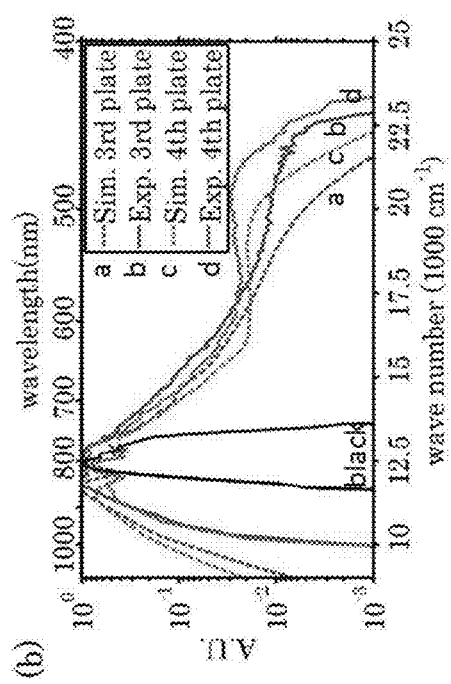
FIG. 2 shows the calculated supercontinuum spectrum upon placement of a third and a fourth plate.

FIG. 2 shows the calculated supercontinuum spectrum upon placement of a third and a fourth plate. In particular, calculated (shown in dotted lines) and measured (shown in solid lines) spectra upon placement of the third and fourth plate in supercontinuum generation using 140 mJ of incident pulse energy are shown. The black spectrum is obtained without using any plate. The general agreement between calculation and experimental results in the figure shows that reduction to practice of this method has been demonstrated.

We describe exemplary systems and methods for supercontinuum generation using multiple plates that optimizes the laser intensity and spacing between plates systematically once the incident laser power, the wavelength, pulse duration, and the material of the medium are selected. While many parameters play an important role in the physics of femtosecond pulse propagation in a medium, there has not been any disclosure on how to manage these parameters to optimize supercontinuum generation as described here. The described method provides a systematic, cost effective, energy saving, time saving approach to generate an extremely broad optical spectrum. It does not require expensive equipment or highly-skilled labor to determine the process parameters and to manufacture the device. It therefore offers major advantages over previously known or described approaches to supercontinuum or white-light generation.

The generated continuum is simple to implement, stable and robust. The power of the continuum is scalable from as little as a few µJ to several mJ for a 30 femtosecond pulse. Thus, multiple-plate generated femtosecond continuum is a promising new light source in many applications that use broadband optical emission. To name a few of such applications, one is ultrafast science and extreme nonlinear optics in which the broadband source can act as a seed pulse in a pulse amplifier, as a means to provide a broad spectrum for carrier-envelope phase stabilization, and after compression as a short pulse for high order harmonics generation or as a gate pulse in short pulse characterization techniques, and for probing ultrafast processes in matter. Another application is using it as a broadband pulse for optical coherence tomography that maps images of biological tissues or solid samples and their depth profile. Another application is for time-resolved spectroscopic sensing of gas, liquid and/or solid state samples, in a microscopic setting or in wide-open space.

Figure 3:
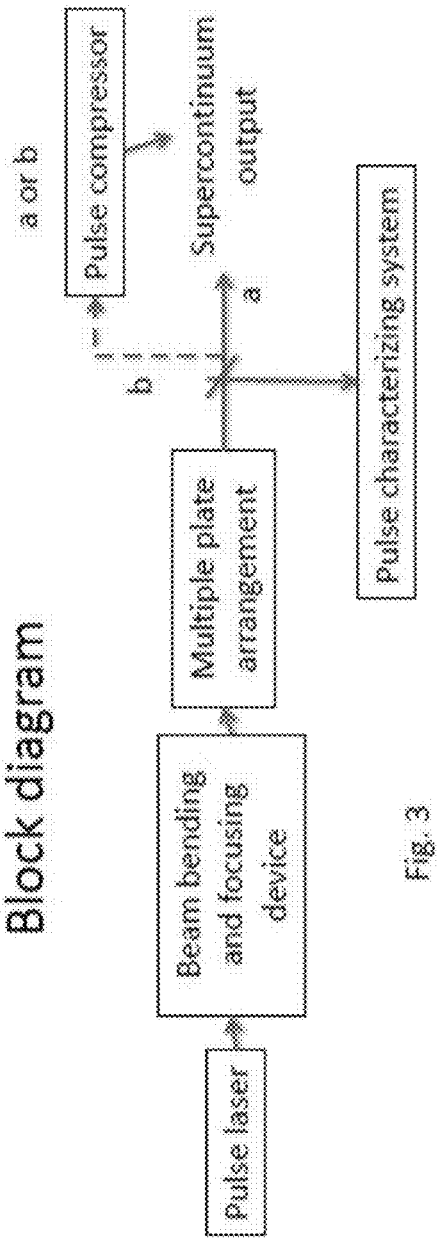
FIG. 3 illustrates an exemplary apparatus according to the present principles.
Figure 4:
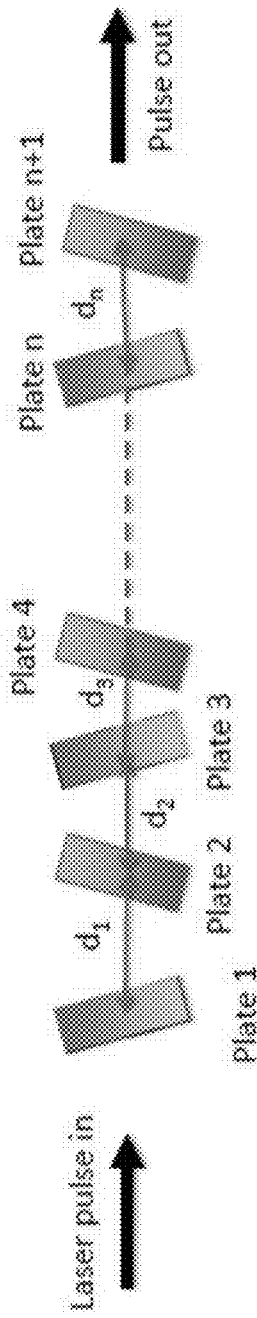
FIG. 4 illustrates another exemplary arrangement according to the present principles.
Figure 5:
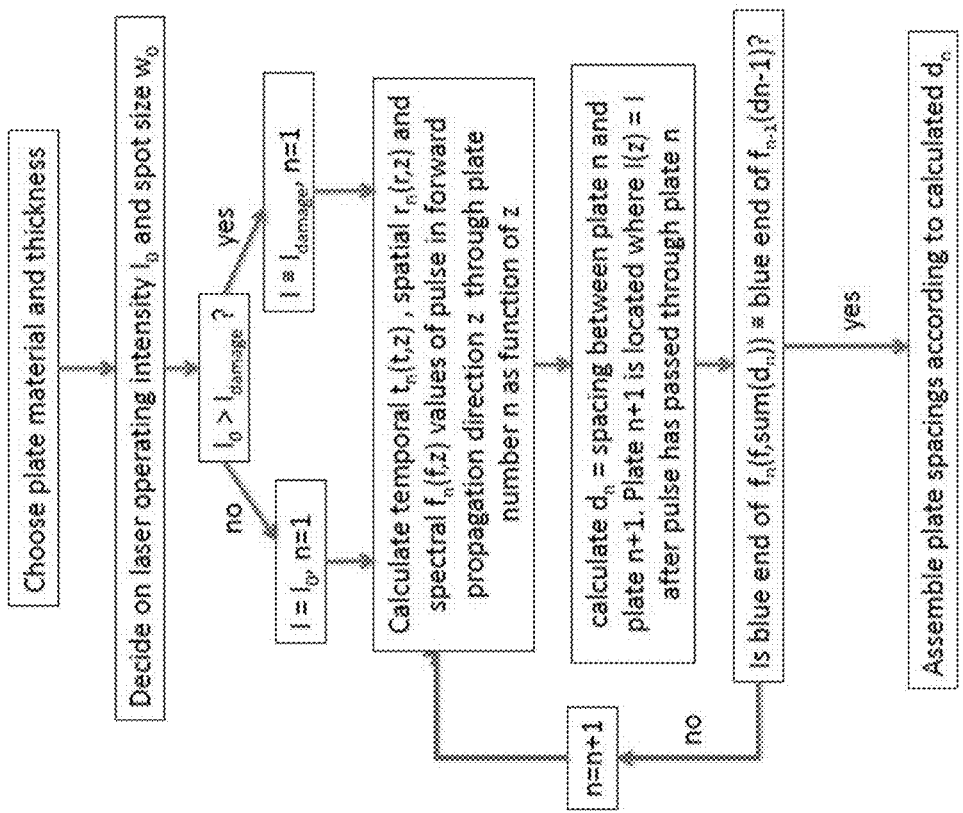
FIG. 5 illustrates an exemplary process according to the present principles.

An exemplary embodiment according to the present principle is shown in FIG. 3. Detailed descriptions of each block in FIG. 3 are presented below:

Pump laser: femtosecond laser, pulse duration 10 to 100 fs. Wavelength is 390 nm to 2000 nm, pulse energy 10 microjoules to 5000 microjoules per pulse.

Beam bending and focusing device: optics for directing the laser pulse to the multiple plate arrangement and focus the pulse into the arrangement.

Multi-plate arrangement: a set of thin plates through which narrowband laser light is converted to broadband laser light. The generated bandwidth can cover more than one octave. For any laser and once the plate thickness is chosen many design parameters such as incident intensity I, beam size w, the spacing d between each pair of plates are determined by this invention.

Pulse characterization system: optics and device or devices for measuring the optical properties of the generated supercontinuum. It may contain a spectrometer, a laser energy meter, photon detection device, interferometer, that are combined for specific purposes of measuring/monitoring the pulse spectrum, pulse width, electric field distribution, pulse energy, and whatever is necessary for a particular application.

Pulse compressor: device to shorten the duration or time distribution inside the supercontinuum pulse. This can be a set of chirped mirrors, prisms, gratings, spatial light modulator, RF light modulator, mechanical mirror arrays.

Octave-Spanning Supercontinuum Generation for Laser Pulses Longer than 50-70 fs

Other exemplary embodiments according to the present principles relate to systems and methods for the design and construction of a multi-plate supercontinuum generator. According the present principles, once the laser characteristics are known, the critical parameters for the design can be determined using criteria disclosed in the description herewith. Simulation and experiments show that for optimal expansion of the spectrum the pulse duration of a transform-limited laser pulse is best to be below 50-70 femtoseconds for a laser wavelength centered near 800 nm. The initial spectral bandwidth of such a laser pulse with Gaussian profile is 50-60 nm at the 1% intensity level. For pulse width that is less than this value, spectral broadening can reach the maximum of larger than one octave at the 1% level. If the pulse duration is longer than 70 fs the effectiveness of spectral broadening will be reduced substantially. Many laser systems on the market have pulse durations in the range of 100-500 fs. Existing methods of spectral broadening do not allow these lasers to attain the full supercontinuum limit of more than one octave bandwidth with high intensity. A solution is needed.

Here we describe systems and methods that preserve the simplicity and strength of the multi-plate spectral broadening arrangement and permit inclusion of a larger range of lasers to be useful for octave-spanning supercontinuum generation. The procedure consists of two steps. The first step is to reduce the pulse duration to less than for example 70 fs or preferably less than 50 fs. This is accomplished by passing the laser pulse through a set of multiple plates whose number is sufficient to broaden the spectrum of the laser pulse, for example to larger than 35 nm at 1% intensity level for a laser wavelength of 800 nm. Since the preferred width is proportional to the square of the laser wavelength, the equivalent broadening desired is larger than 55 nm if the laser wavelength is 1000 nm, and so on. After the first broadening stage the temporal duration of the pulse will be lengthened due to nonlinear interaction of the light pulse with the plates.

Figure 6:
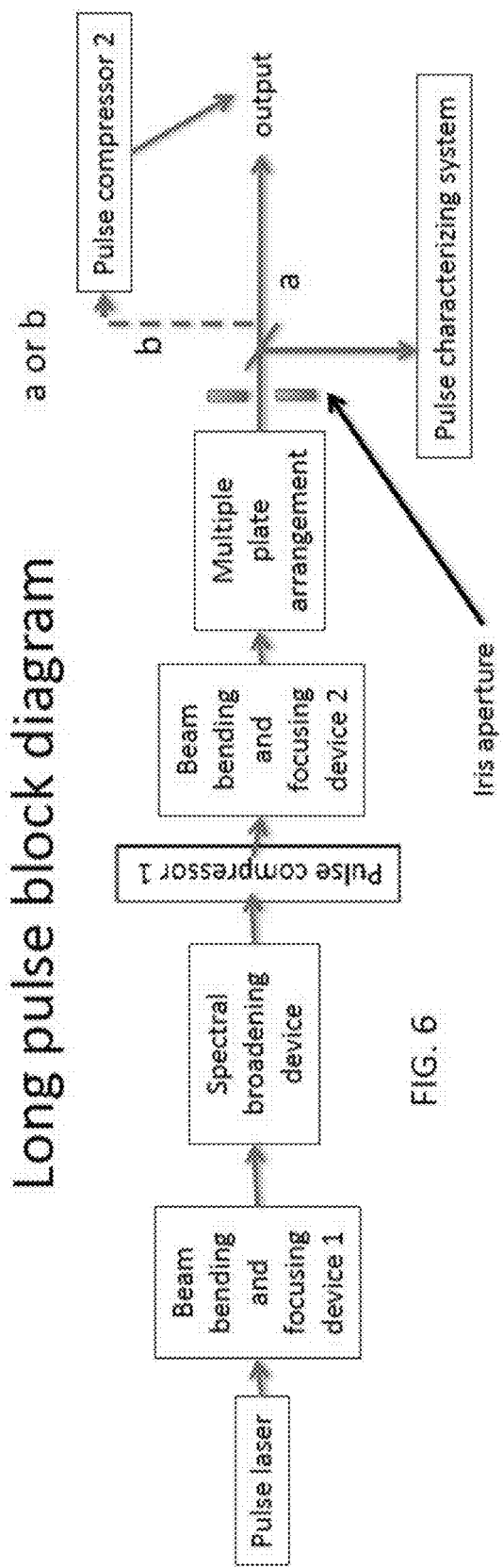
FIG. 6 illustrates another exemplary apparatus according to the present principles.
Figure 7:
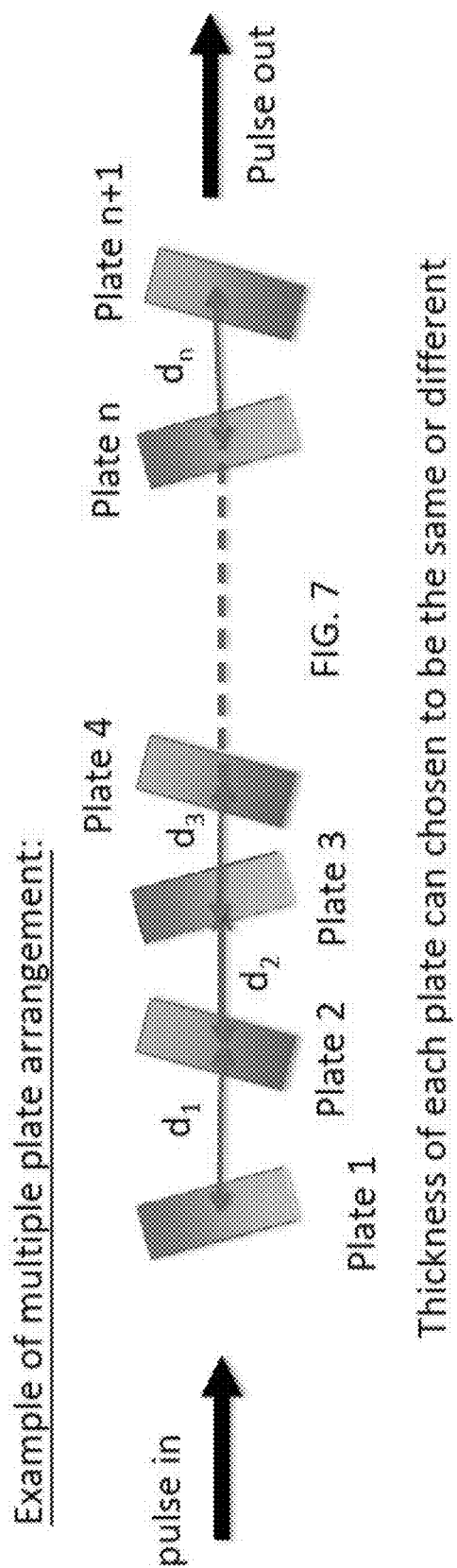
FIG. 7 illustrates another exemplary arrangement according to the present principles.

The pulse duration is then reduced to a level at or near the transform-limit by a compressor which can be a pair of gratings, a pair of chirped mirrors, a pair of prisms, or a combination of these. With the spectral bandwidth at the value as specified, the pulse duration will be reduced to less than 50-70 fs and the pulse is ready for use in supercontinuum generation in the second step which is similar to that described previously. FIG. 6 and FIG. 7 show the exemplary embodiments according to the present principles. The pulse broadening in the first stage can also be achieved using fibers, waveguides or in gases. But these latter methods are less desirable for similar reasons described previously.

Below are detailed descriptions of FIG. 6 and FIG. 7, according to the present principles:

Pump laser: femtosecond laser, pulse duration 100 to 500 fs. Wavelength is 390 nm to 2000 nm, pulse energy is 10 microjoules to 5000 microjoules per pulse.

Beam bending and focusing device 1 and 2: optics for directing the laser pulse to the multiple plate arrangement and focus the pulse into the arrangement.

Spectral broadening device: optical arrangement that broadens the laser pulse spectrum to 25-80 nm. It can be a solid material such as a multiple plate arrangement or a single piece of solid material, a length of fiber, or it can be a gas confined in a capillary.

Pulse compressor 1 and 2: device to shorten the duration or time distribution of an optical pulse. This can be a set of chirped mirrors, prisms, gratings, spatial light modulator, RF light modulator, mechanical mirror arrays.

Multi-plate arrangement: a set of thin plates through which narrowband laser light is converted to broadband laser light. The generated bandwidth can cover more than one octave. For any laser and once the plate thickness is chosen many design parameters such as incident intensity I, beam size w, the spacing d between each pair of plates are determined by this invention.

Pulse characterization system: optics and device or devices for measuring the optical properties of the generated supercontinuum. It may contain a spectrometer, a laser energy meter, photon detection device, interferometer, that are combined for specific purposes of measuring/monitoring the pulse spectrum, pulse width, electric field distribution, pulse energy, and whatever is necessary for a particular application.

Generation of Circularly-Polarized Supercontinuum

Large classes of matter in nature respond differently to electromagnetic radiation with its field vector that rotates in the clockwise direction versus the anti-clockwise direction. Matters with these two different responses are commonly classified as being right-handed or left-handed. In order to understand the structure and behavior of these matters it is necessary to have radiation or light whose handedness can be controlled. Handed radiation is called circularly-polarized with its electric field vector rotating in a circular pattern in space or time as the radiation propagates through matter. Circularly-polarized radiation or light can be produced by passing linearly-polarized light through a quarter-wave plate. Material properties dictate that the useful or effective bandwidth of quarter-wave plates is limited to a few hundred nm. So simply sending an octave spanning supercontinuum through a quarter-wave plate for producing octave-spanning circularly-polarized supercontinuum radiation is not feasible due to the lack of a suitable quarter-wave plate. Another approach is to convert narrowband circularly-polarized light to ultrabroad band circularly-polarized light by method of supercontinuum generation. Existing methods of supercontinuum generation employ photonic crystal fibers or waveguides. The electric fields that pass through these devices generally are required to have linear polarization. Otherwise the field polarization will be changed at the exit end of the device. Hence producing circularly-polarized light using these devices has not been demonstrated. For this reason theoretical models analyzing supercontinuum generation have only dealt with linear polarization. Furthermore only linearly-polarized light has been disclosed in using multi-plate for supercontinuum generation.

Figure 8:
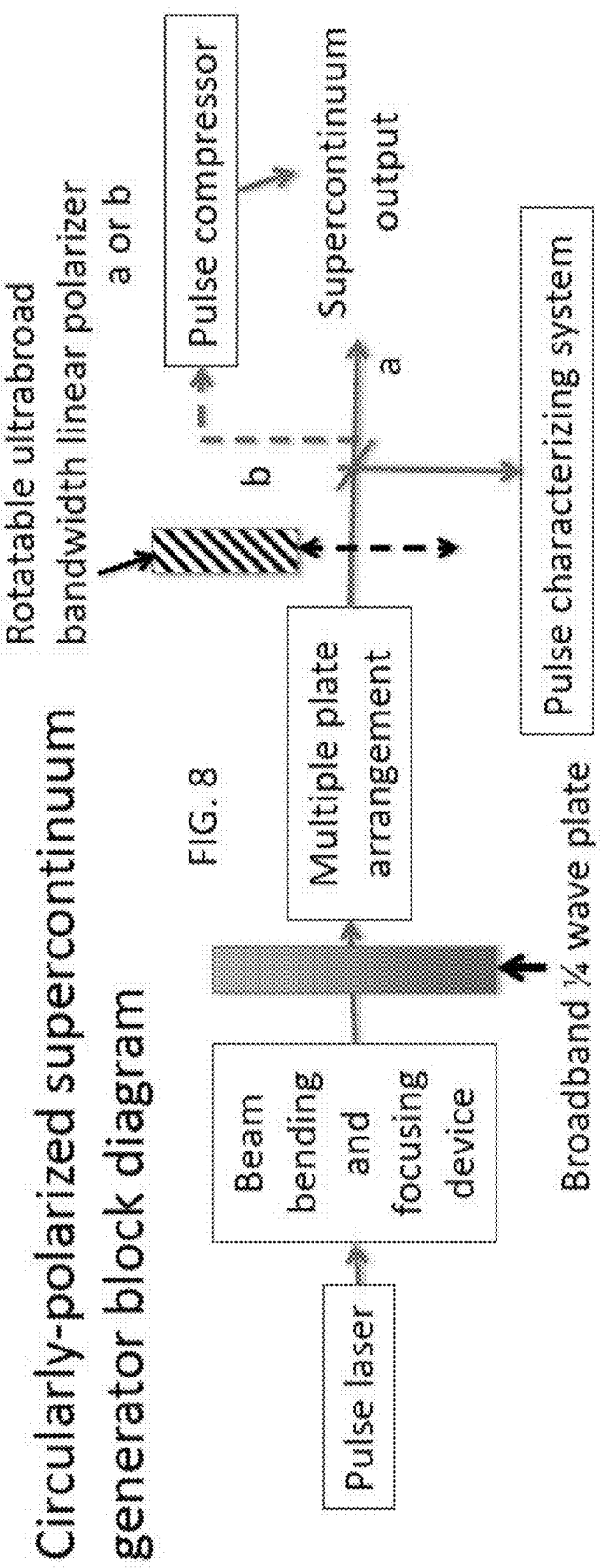
FIG. 8 illustrates another exemplary apparatus according to the present principles.

According to the present principles, exemplary methods and apparatuses that produce circularly-polarized octave-spanning light from the output of a laser are presented and illustrated in FIG. 8 and FIG. 9. We note that essentially all high intensity laser outputs are linearly polarized. In an exemplary embodiment, linearly-polarized laser light is first converted to circular polarization with a quarter-wave plate. This works well because the bandwidth of intense lasers is typically less than 100 nm and is within the effective bandwidth of quarter-wave plates. The now circularly-polarized laser light is then passed through a multiple-plate light generation apparatus in a manner similar to that described in our previous disclosures for linearly-polarized light with one important difference. Instead of being at Brewster's angle each plate is inserted at near-normal incidence to the laser beam. The angle of incidence for each plate should be the same, but alternating in sign, and within plus-minus a few degrees of normal. The intent is to preserve the polarization of the incident and generated light passing through the apparatus. The exemplary apparatus includes insertion of a broadband linear polarizer into the output beam to determine that the output is indeed circularly polarized. Accepted theory describes and is well known in the art that when circularly-polarized light passes through a linear polarizer the transmitted power is independent of the rotation angle of the polarizer. Once tested to be the case, the output pulse is confirmed to be circularly polarized and can be used for downstream applications. As illustrated in FIG. 9, thickness of each plate shown may be chosen to be the same or different. In addition, the angel of incidence for each plate should be the same, but alternating in direction as shown, and within ± a few degrees of normal.

Below are detailed descriptions of FIG. 8 and FIG. 9, according to the present principles.

Pump laser: femtosecond laser, pulse duration 10 to 100 fs. Wavelength is 390 nm to 2000 nm, pulse energy is 10 microjoules to 5000 microjoules per pulse, linearly polarized.

Beam bending and focusing device: optics for directing the laser pulse to the multiple plate arrangement and focus the pulse into the arrangement.

Broad bandwidth ¼-wave plate: broadband (circa 100-150 nm bandwidth) quarter-wave plate to convert laser output from linear polarized to circularly polarized.

Rotatable Ultrabroad bandwidth polarizer: ultrabroadband (octave-spanning) polarizer mounted on a rotating support and could be inserted at will into the beam.

Multi-plate arrangement: a set of thin plates through which narrowband laser light is converted to broadband laser light. The generated bandwidth can cover more than one octave. Angle of incidence for each plate should be the same, but alternating in direction as shown, and within plus-minus a few degrees of normal.

Pulse characterization system: optics and device or devices for measuring the optical properties of the generated supercontinuum. It may contain a spectrometer, a laser energy meter, photon detection device, interferometer, that are combined for specific purposes of measuring/monitoring the pulse spectrum, pulse width, electric field distribution, pulse energy, and whatever is necessary for a particular application.

Pulse compressor: device to alter the duration or time distribution inside the supercontinuum pulse. This can be a set of prisms, gratings, spatial light modulator, RF light modulator, mechanical mirror arrays.

The invention claimed is:

1. A continuous spectrum generation apparatus, comprising:
 a laser light source configured to emit a laser beam;
 a plurality of condensed state transparent plates, disposed in sequence on a transmitting path of the laser beam to successively and sequentially extend a spectral bandwidth of the laser beam, wherein one or more of temporal, spatial and spectral value of a pulse of the laser beam in a forward propagation direction z through a plate number n are determined as a function of z;
 a pulse characterization apparatus configured to characterize the pulse of the laser beam; and
 wherein a spacing between two of the plurality of plates is determined by where an intensity of the laser beam is $\lambda/(2n_0 n_2 L)$, where $\lambda$ is the central incident wavelength in vacuum, $n_0$ is the linear refractive index, $n_2$ is the third-order nonlinear coefficient, L is the thickness of the plates.

2. The apparatus of claim 1 wherein spacing between two of the plurality of plates is determined by where an intensity of the laser beam is less than 0.9 times a damage intensity of a generating medium.

3. The apparatus of claim 1 wherein spacing between two of the plurality of plates is determined by where an intensity of the laser beam is less than 0.6 times a damage intensity of a generating medium.

4. The apparatus of claim 1 wherein $n_2$ is a Kerr coefficient.

5. The apparatus of claim 1 wherein duration of the pulse of the laser beam is below 70 femtoseconds.

6. The apparatus of claim 1 wherein duration of the pulse of the laser beam is below 50 femtoseconds.

7. The apparatus of claim 1 wherein the plurality of condensed state transparent plates broaden the spectral value of the pulse of the laser beam to a range of 100-2000 nm.

8. The apparatus of claim 1 wherein the pulse characterization apparatus comprises an optical spectrometer and a frequency-resolved optical gating arrangement to measure the pulse duration between 3 fs to 1000 fs.

9. The apparatus of claim 1 wherein the pulse duration of the laser beam is below 500 femtoseconds.

10. The apparatus of claim 1 wherein the plurality of condensed state transparent plates broaden the spectral value of the pulse of the laser beam to a range of 30-85 nm.

11. The apparatus of claim 1 further comprising another set of a plurality of condensed state transparent plates concatenated to the plurality of plates of claim 1.

12. The apparatus of claim 11 further comprising a pulse compressor inserted between the two sets of plurality of condensed state transparent plates.

13. The apparatus of claim 1 further comprising a broad bandwidth quarter-wave plate configured to convert the emitted laser beam from the laser light source from a linearly polarized to a circularly polarized laser beam.

14. The apparatus of claim 13 wherein the broadband quarter-wave plate has an effective wavelength bandwidth in the range of 100-150 nm.

15. The apparatus of claim 1 wherein the plurality of plates are optically polished.

16. The apparatus of claim 1 further comprising a pulse compressor configured to shorten the supercontinuum pulse outputted from the plurality of condensed state transparent plates.

17. A method for supercontinuum generation using a laser beam and a plurality of condensed state transparent plates, comprising:
    determining plate material to be used for one of the plurality of plates;
    determining a thickness of the one of the plurality of plates; and
    determining an allowable laser intensity of the laser beam to be $\lambda/(2n_0 n_2 L)$, where $\lambda$ is the central incident wavelength in vacuum, $n_0$ is the linear refractive index, $n_2$ is the third-order nonlinear coefficient; and
    determining a location of a next plate be a distance downstream from the one of the plurality of plates where a laser intensity of the laser beam returns to a value of the determined allowable laser intensity.

18. The method of claim 17 wherein $n_2$ is the Kerr coefficient.

19. The method of claim 17 wherein the laser beam is pulsing below 70 femtoseconds.

20. The method of claim 17 wherein the laser beam is pulsing below 50 femtoseconds.

21. The method of claim 17 wherein the plurality of condensed state transparent plates broaden the spectral value of the laser beam to a range of 100-2000 nm.

22. The method of claim 17 wherein the pulse duration of the laser beam is below 500 femtoseconds.

23. The method of claim 17 wherein the plurality of condensed state transparent plates broaden the spectral value of the pulse of the laser beam to a range of 30-85 nm.

24. The method of claim 17 further comprising another set of a plurality of condensed state transparent plates concatenated to the plurality of plates of claim 17.

25. The method of claim 24 further comprising a pulse compressor inserted between the two sets of plurality of condensed state transparent plates.

26. The method of claim 17 further comprising providing a broad bandwidth quarter-wave plate configured to convert the emitted laser beam from the laser light source from a linearly polarized to a circularly polarized laser beam.

27. The method of claim 26 wherein the broadband quarter-wave plate has an effective wavelength bandwidth in the range of 100-150 nm.

28. The method of claim 17 wherein the plurality of plates are optically polished.

* * * * *